(No Model.)

W. PORTLOCK.
CAR COUPLING.

No. 433,305. Patented July 29, 1890.

WITNESSES:
Fred G. Dieterich
Jos. A. Ryan

INVENTOR:
Warren Portlock.
BY Munn & Co
ATTORNEYS

UNITED STATES PATENT OFFICE.

WARREN PORTLOCK, OF SAN DIEGO, CALIFORNIA, ASSIGNOR, BY DIRECT AND MESNE ASSIGNMENTS, OF PART TO LUIS MENDELSON AND GEORGE FULLER, OF SAME PLACE.

CAR-COUPLING.

SPECIFICATION forming part of Letters Patent No. 433,305, dated July 29, 1890.

Application filed December 26, 1889. Serial No. 335,010. (No model.)

*To all whom it may concern:*

Be it known that I, WARREN PORTLOCK, of San Diego, in the county of San Diego and State of California, have invented a new and useful Improvement in Car-Couplings, of which the following is a specification.

My invention has for its object to provide a car-coupling of simple construction which will operate to automatically couple cars in a simple and effective manner.

My invention consists in certain novel features of construction and peculiar combination of parts, all of which will be hereinafter fully described in the annexed specification, and particularly pointed out in the claims, reference being had to the accompanying drawings, in which—

Figure 1:
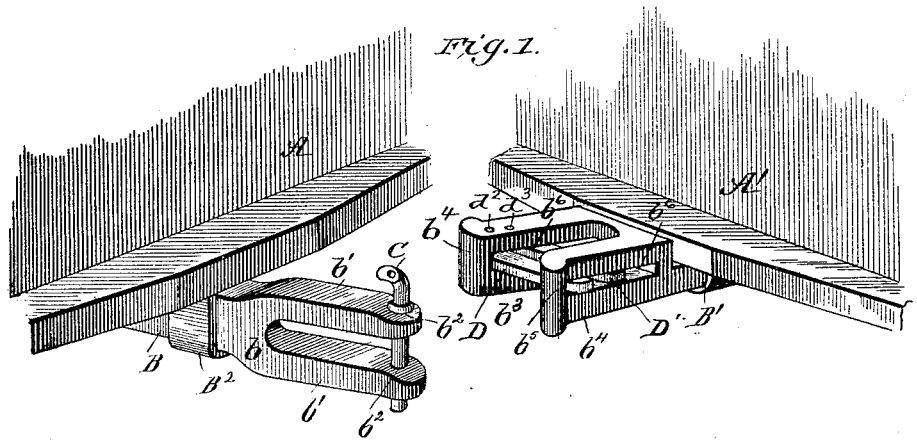
Figure 2:
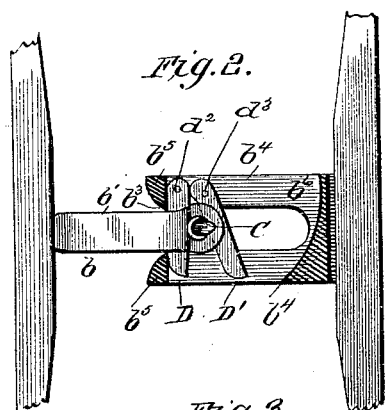
Figure 3:
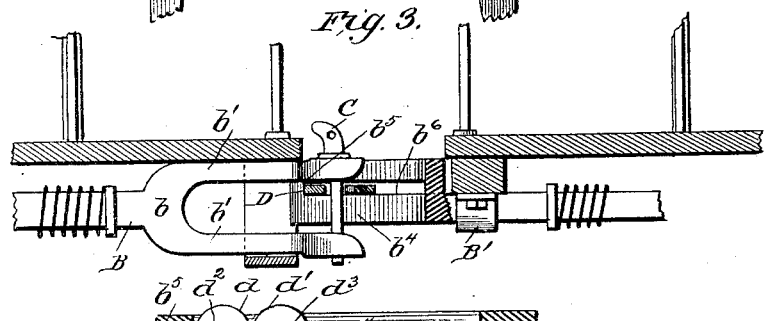

Figure 1 is a perspective view of the meeting ends of two cars, with my improved coupling-heads applied. Fig. 2 is a top plan view, partly in section, of the same coupled. Fig. 3 is a side view of the same coupled, but applied to passenger-car platforms; and Fig. 4 is a detail view hereinafter specifically referred to.

In the accompanying drawings, A A' indicate the ends of box or freight cars, for which my improved coupling is more especially adapted, it being understood, however, that the same may be readily applied to passenger-cars without changing the construction thereof. B B' denote the draw-bars, one of which B is formed with a vertical head $b$, having a recessed or forked end, forming horizontal arms $b'$ $b'$, disposed in the same vertical alignment, the outer ends of which are formed with the usual pin-receiving holes $b^2$ $b^2$, adapted to receive the coupling-pin C.

In adjusting the draw-bar B in position I arrange same so it will have a slight lateral movement in its support $B^2$, for a purpose presently explained. The draw-bar B' has its head $b^3$ bifurcated, and is formed with arms $b^4$ $b^4$ in a manner similar to the head $b$ of the bar B; but it is disposed horizontally, so as to engage the head $b$ at right angles thereto. In horizontal slots $b^6$ $b^6$, formed in the arms $b^4$ $b^4$ of the head $b^3$, I pivot the swinging coupling-links D D', one of which D is of less length than the link D'. To provide said links for automatic operation to couple the heads together, I pivot them in a novel manner and arrange their projecting ends $d$ $d'$ to engage each other, so as to serve as a means for returning the links to a position for coupling after they have been engaged by the pin C. To this end I pivot the said links in a manner most clearly illustrated in Fig. 4 of the drawings, from which it will be observed I pivot the link D at $d^2$ and the link D' at $d^3$, said pivot $d^3$ being at a point to the rear of and slightly in advance of the pivot $d^2$. The rear end $d$ of the link D is formed slightly cam-shaped and normally engages the end $d'$ of the link D at a point between their pivots. By this construction it will be observed that when the cars come together the vertically-disposed pin C will enter between the bifurcated ends of the draw-head $b^3$, the arms $b'$ $b'$ of the head B being disposed over and under the said horizontal head B' in a manner clearly shown in Fig. 3 of the drawings.

Figure 4:
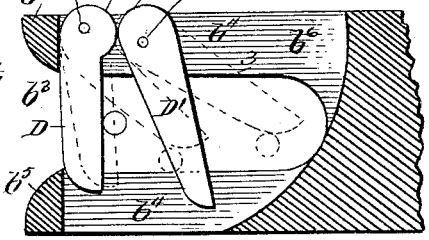

As the pin C engages the link D, it will swing same to a position shown in dotted lines, Fig. 4, and owing to the lateral movement of the head B will pass by said link and engage the link D' and swing same to a position shown at dotted lines 3, Fig. 4. Now it will be seen that after the pin C passes the link D and engages the link D' the rear end of the said link D' will engage the link D in advance of its pivot, and the end $d'$, being also slightly cam-shaped, as shown, will force said link back over the slot and thereby lock the pin in and thereby coupling the cars together. Now, when the draw-bar B is pulled forward the pin C will engage the rear edge of the link D and cause it to move forward against a stop portion $b^5$ of the head $b^3$, such movement causing the cam-like end $d$ of said link to engage the end $d'$ to the rear of its pivot, thereby swinging the said link back into normal position.

In Fig. 3 I have shown the draw-bar B B' as applied to the platforms of passenger-cars. It will be observed that I extend the horizontal draw-bar B' beyond the platform while the bar B has only its extreme end beyond its platform, thereby enabling said platforms to come close together.

It will be understood that in the practical application of my coupler I will construct the draw-heads B and B' with both the vertical and horizontal bifurcated heads, so the cars may be readily coupled from either end in a manner clearly understood by those familiar with couplings of this class.

From the foregoing description, taken in connection with the drawings, the advantages of my improved coupler will readily appear. It will be seen that the same is exceedingly simple in construction and operation, and may be readily applied to cars now in use without changing the construction thereof.

Having thus described my invention, what I claim, and desire to secure by Letters Patent, is—

1. An improved car-coupler, consisting of a vertically-disposed draw-head B, horizontally bifurcated, a coupling-pin C, held in the end of said bifurcated head, a horizontally-disposed head B', vertically bifurcated, swinging links D D', disposed in the end of said bifurcated head B', the link D' provided with a projection $d'$ engaging the link D in advance of its pivot, said pin C adapted to enter the slotted end of the bar B' to engage and pass the link D in coupling and to engage the link D', whereby its projecting portion $d'$ will engage the link D and swing it over the bifurcated end of the head B', substantially as and for the purpose described.

2. The combination, with the vertically-bifurcated draw-head B, provided with a coupling-pin C in its outer end, of the horizontally-bifurcated draw-head B', provided with horizontally-disposed swinging links D D', pivoted at one end to one side of the said draw-head, the link D provided with a cam-like projecting end $d$, the link D' having a similar projection $d'$, said projection $d'$ engaging the link D in advance of its pivot, the projection $d$ engaging the projection $d'$ to the rear of its pivot, said coupling-link C adapted to enter the slotted draw-head B', engage and pass the link D, and engage the link D' to force same rearward, whereby such movement of the link D' will cause its projection $d'$ to force the link D across the slotted end of the draw-bar B', the forward movement of said pin adapted to engage the rear edge of the link D, whereby its projection $d$ will bear against the end $d'$ of the link D and force it back to its normal position, substantially as and for the purpose described.

3. The combination, with the vertically-slotted draw-head B, provided with a coupling-pin C, of the horizontally-slotted draw-head B', the links D D', pivoted in said head B' to swing in a horizontal plane, provided with abutting extensions $d\ d'$, the links D' pivoted in advance of the link D, a shoulder or abutment on said head B' for limiting the forward movement of the link D, all arranged substantially as and for the purpose described.

WARREN PORTLOCK.

Witnesses:
FRANK P. FLINT,
GEO. H. BUCKINGHAM.